United States Patent [19]

Koga et al.

[11] Patent Number: 4,969,039

[45] Date of Patent: Nov. 6, 1990

[54] IMAGE PROCESSING SYSTEM OPERABLE IN COOPERATION WITH A RECORDING MEDIUM

[75] Inventors: Toshio Koga; Junichi Ohki; Mutsumi Ohta; Yoshihiro Miyamoto, all of Tokyo; Hideto Kunhiro, Osaka, all of Japan

[73] Assignees: NEC Corporation; NEC Home Electronics Ltd., both of Japan

[21] Appl. No.: 213,534

[22] Filed: Jun. 30, 1988

[30] Foreign Application Priority Data

| Jul. 1, 1987 | [JP] | Japan | 62-165957 |
| May 16, 1988 | [JP] | Japan | 63-119844 |
| May 18, 1988 | [JP] | Japan | 63-122557 |
| May 18, 1988 | [JP] | Japan | 63-122558 |

[51] Int. Cl.$^5$ .............................................. H04N 5/76
[52] U.S. Cl. ................................. 358/335; 358/135; 358/136
[58] Field of Search ............... 358/105, 335, 133, 135, 358/136, 342; 382/56; 360/9.1, 8, 33.1, 32, 39, 40

[56] References Cited

U.S. PATENT DOCUMENTS

| 4,307,420 | 12/1981 | Ninomiya | 358/105 |
| 4,591,909 | 5/1986 | Kuroda et al. | 358/136 |
| 4,636,862 | 1/1987 | Hatori | 358/105 |
| 4,689,671 | 8/1987 | Ohki | 358/135 |
| 4,710,826 | 12/1987 | Sakurai | 360/19.1 |
| 4,802,005 | 1/1989 | Kon Do | 358/135 |

Primary Examiner—Robert L. Richardson
Attorney, Agent, or Firm—Ostrolenk, Faber, Gerb & Soffen

[57] ABSTRACT

In an image processing system for use in processing a sequence of image signals carrying a moving image, the image signal sequence is divided into a sequence of partial image signals each of which carries a scene subsequence defined by scene changes. A background signal generator determines a background portion of the moving image by monitoring a whole of each partial image signal and produces a background signal. The background signal is coded by a coder prior to a sequence of error signals resulting from predictive coding of each partial signal. During prediction of the background signal, the error signals may be rendered to zero in the coder. The background signal may be either determined at every picture element or at every block composed of a plurality of picture elements.

9 Claims, 9 Drawing Sheets

IMAGE PROCESSING SYSTEM OPERABLE IN COOPERATION WITH A RECORDING MEDIUM

BACKGROUND OF THE INVENTION

This invention relates to an image processing system which is for use in combination with a recording medium, such as a compact disk read-only memory (CD-ROM), or a magnetic video tape, and which comprises an image recording system and an image reproducing system for recording on and reproducing from the recording medium a sequence of recording signals.

In copending U.S. patent application Ser. No. 189,249, filed May 2, 1988, and assigned to the present assignee, Toshio Koga et al. have proposed an image processing system of the above-described type wherein a sequence of image signals is recorded on a CD-ROM by the use of an efficient coding technique and is reproduced in an offline manner. Such system will be referred to as an offline image processing system. With this system, intraframe coding is skillfully used in combination with interframe coding to code the image signal sequence into a sequence of recording signals which has a remarkably reduced amount of information. According to the offline image processing system, it is possible to reproduce a sequence of images from the CD-ROM for a long time of, for example, one hour or so. In addition, the offline image processing system enables a reverse reproduction, a high speed reproduction, a skip reproduction of the image sequence, and the like. At any rate, the CD-ROM can be used in the offline image processing system as well as a video tape.

Meanwhile, the image signal sequence usually carries a rapidly moving image and a comparatively stationary image which slowly varies in comparison with the rapidly moving image and which may be called a background image. As known in the art, such a background image may be specified by a small amount of information as compared with a rapidly moving image. This shows that a further redundancy reduction can be achieved by distinguishing between the background image and the rapidly moving image and by coding the background image in a manner different from the rapidly moving image.

However, no consideration has been made in the above-referenced United States Application as regards processing the background image which can be distinguished from the rapidly moving image.

In Hideo Kuroda et al. U.S. Pat. No. 4,591,909 issued an interframe coding method is disclosed wherein a background image is distinguished from a moving image and is selectively subjected to predictive coding. The interframe coding method might be effectively used in a television conference system wherein a sequence of coded signals is transmitted from a transmitting end to a receiving end in real time or in an on-line manner. In this connection, the above-mentioned method may be called an online coding method.

However, the online coding method might not be always optimum on recording a sequence of images and for reproducing the recorded images in an offline manner. This is because a current background image signal is determined in the online coding method at a current time instant only in dependence upon a sequence of past image signals preceding the current background signal and might be determined in an offline image processing system not only in dependence upon the past image signals but also in dependence upon a sequence of succeeding image signals.

SUMMARY OF THE INVENTION

It is an object of this invention to provide an image processing system capable of reducing an amount of information that should be recorded on a recording medium, such as a CD-ROM.

It is another object of the invention to provide an image processing system of the type described, which is suitable for reproducing a sequence of image signals in an offline manner.

According to an aspect of this invention, an image processing system is for use in processing a sequence of image signals into a sequence of processed signals. The image signals carry a moving image which is variable with time and which is sectioned into a rapidly moving portion and a background portion slowly varying in comparison with such rapidly moving portion. The image signal sequence is divisible into a sequence of partial image signals. The image processing system comprises detecting means responsive to each of the partial image signals for detecting the background portion at every partial image signal to produce a background signal specific to the background portion; coding means coupled to the detecting means and responsive to the image signal sequence for predictively coding the image signal sequence into a sequence of coded signals with reference to presence and absence of the background signal, respectively; and means for producing the coded signal sequence as the processed signal sequence.

Other features and advantages of the present invention will become apparent from the following description of the invention which refers to the accompanying drawings.

DESCRIPTION OF THE PREFERRED EMBODIMENTS

Figure 1:
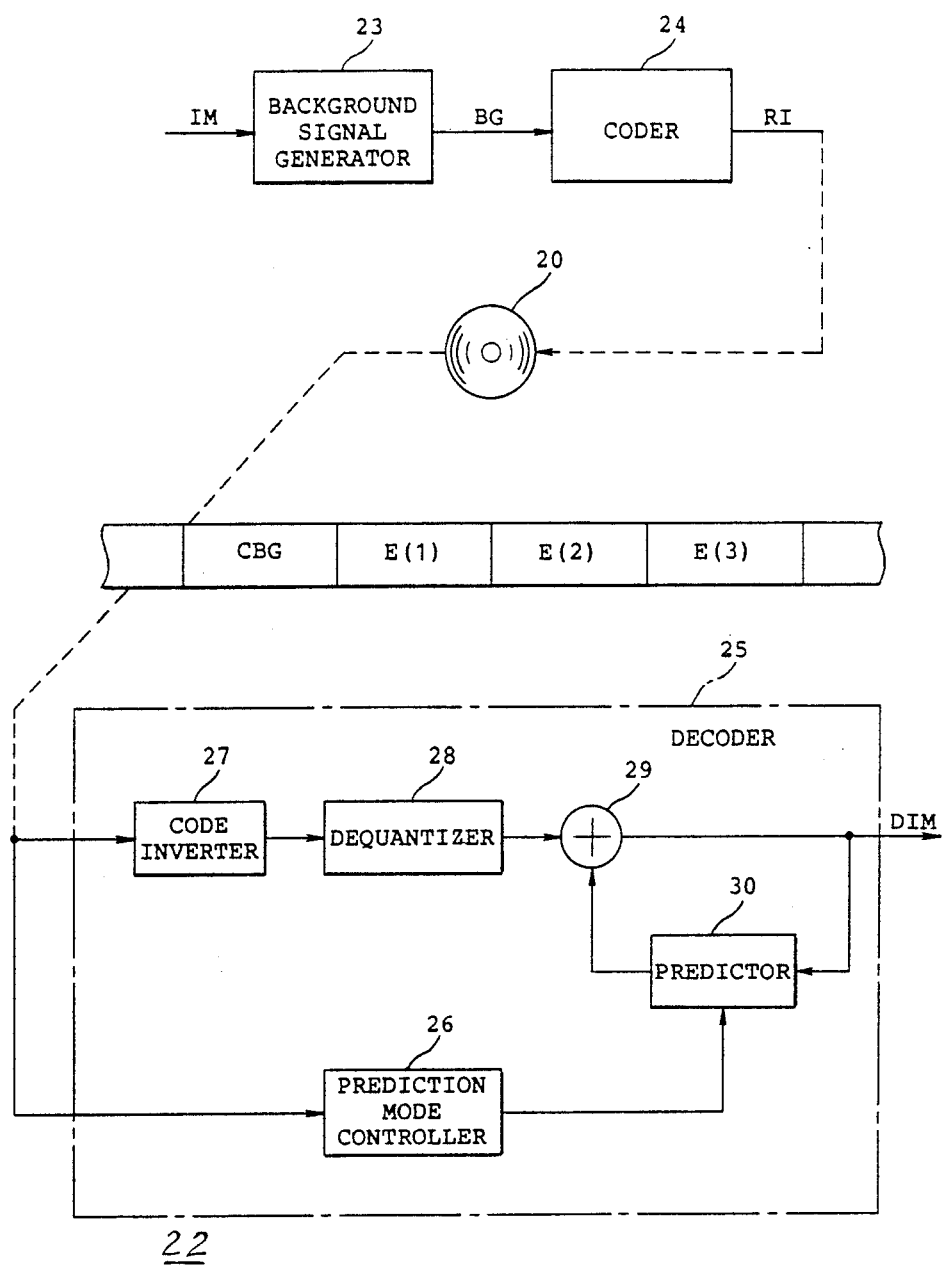
FIG. 1 is a block diagram of an image processing system according to a first embodiment of this invention.
Figure 2:
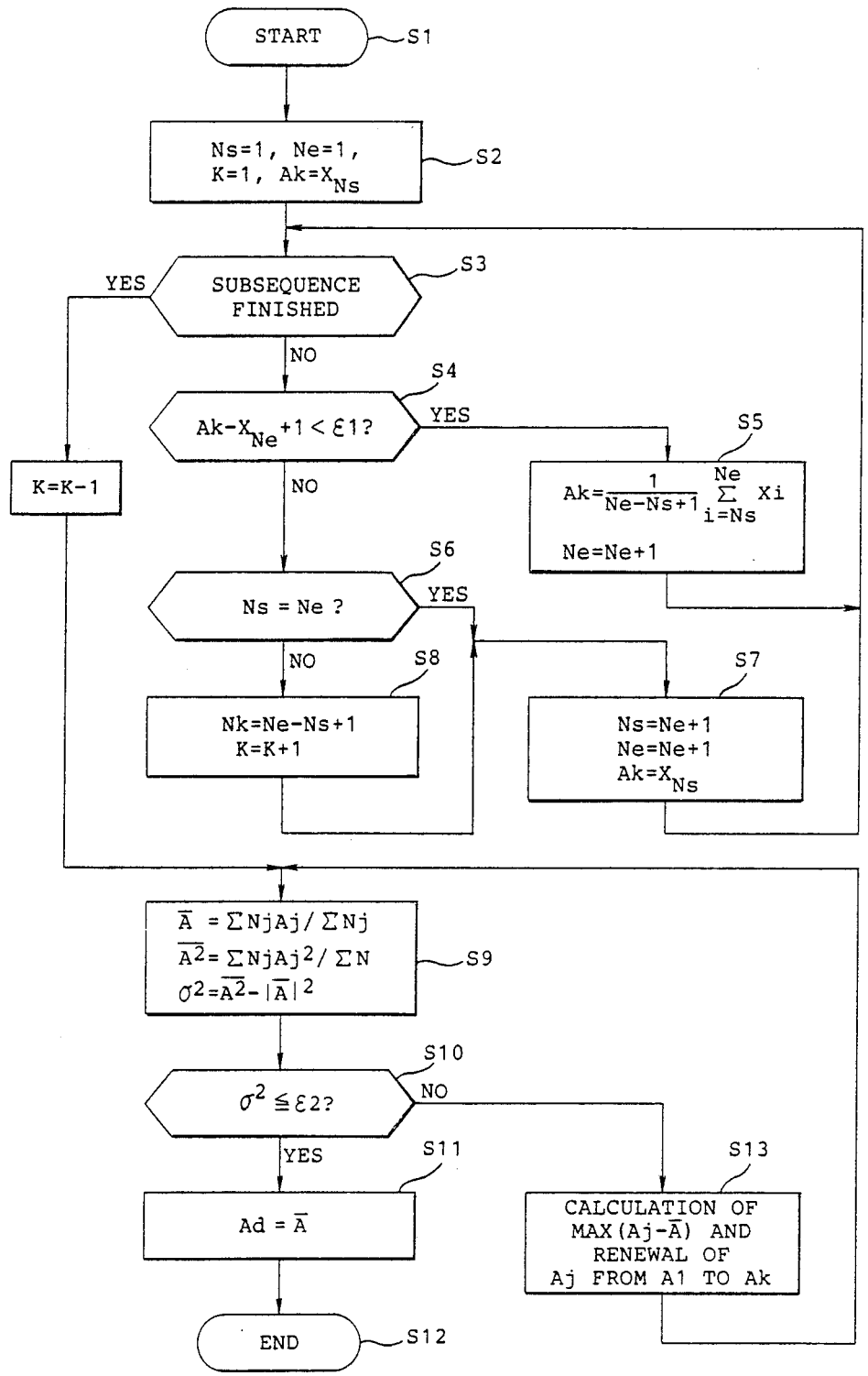
FIG. 2 is a flow chart for use in describing operation of the image processing system illustrated in FIG. 1.

Referring to FIGS. 1 and 2, an image processing system according to a first embodiment of this invention is for use in combination with a recording medium 20, such as a CD-ROM, and comprises an image recording system 21 and an image reproducing system 22 for recording on and reproducing from the recording medium 20 a sequence of recording signals RI, The illustrated recording system 21 is supplied with a sequence of image signals IM which carry a moving image variable in level with time and which is divisible into a sequence of frames. Each of the frames is composed of a plurality of picture elements which may be provided as either an analog signal or a digital signal. The moving image is sectioned into a rapidly moving portion and a comparatively stationary portion which slowly varies in comparison with the rapidly moving portion and which may be called a background portion. The moving image may visually appear as a sequence of scenes on displaying the moving image on a display device (not shown). The scene sequence is divisible into a plurality of scene sets or scene subsequences each of which is partitioned by two adjacent ones of scene changes at which the moving image is drastically changed. Such a scene subsequence usually lasts for an interval of time longer than each frame and is represented by a partial image signal given by dividing the image signal sequence IM. In the example being illustrated, it is noted that the recording system 21 processes the image signal sequence IM at every scene subsequence defined by the scene changes.

More specifically, the illustrated image recording system 21 comprises a background signal generator 23 operable in response to each partial image signal representative of each scene subsequence of the image signal sequence IM to produce a background signal BG in a manner to be later described with reference to FIG. 2. This shows that the background signal BG is determined by surveying a whole of each scene subsequence and is kept invariable during each scene subsequence. In other words, the background signal BG is not determined only in dependency upon past ones of the image signals IM but in dependency upon each scene subsequence lasting for a time length from a past to a future. Therefore, it may be said that the background signal BG is dependent not only upon past image signals but also upon future image signals.

The background signal BG may be composed of a sequence of background data elements (will be designated A) for the picture elements forming each frame. In this event, an invalid flag may be assigned to a picture element unused as the background data elements.

In FIG. 2, let the background signal generator 23 be given a certain scene subsequence as a certain partial image signal which lasts for a plurality of the frames and which is composed of a predetermined number of picture elements designated x at every frame. In this connection, each of the picture elements x in the scene subsequence is assumed to have a level $X_i$ at an i-th frame and to be processed to calculate each background data element A. It is also assumed (i) that a certain one of the picture element x in the scene subsequence in question is comparatively stationary during the scene subsequence and a continuance of the certain picture element x is divided into a plurality of comparatively stationary portions the number of which is designated a variable natural number k in FIG. 2 and (ii) that a k-th one of the comparatively stationary portions, namely, a k-th stationary portion lasts for an interval between a start frame Ns and an end frame Ne. The background signal generator 23 serves to calculate an average level Ak of the k-th stationary portion and a time interval specified by the number Nk of frames between the start and the end frames.

Under the circumstances, the background signal generator 23 may be a microprocessor, which and starts operation at a first step S1 followed by a second step S2 at which initial values are given as regards the k-th stationary portion of the certain picture element x. In the example, the number k, the start frame Ns, and the end frame Ne are set to 1 as the initial values, as shown in FIG. 2. In addition, the average level Ak is assumed to be equal to $X_{Ns}$, which represents a level of the certain picture element of the start frame Ns. The second step S2 proceeds to a third step S3 for judging whether or not the certain picture element x is completely processed over the scene subsequence by the background signal generator 23. If the processing is not finished in connection with the certain picture element x of the scene subsequence, the third step S3 is succeeded by a fourth step S4 at which a following level $X_{(Ne+1)}$ of the following frame is subtracted from an average level Ak so as to detect whether or not a difference between the average level Ak and the following level $X_{(Ne+1)}$ falls within a first predetermined range $\epsilon_1$. When the difference falls within the first predetermined range $\epsilon_1$, the fourth step S4 is followed by a fifth step S5 at which the average level Ak is renewed as a renewed average level (depicted at the same reference symbol Ak) in consideration of the following level $X_{(Ne+1)}$ in accordance with Equation (1) given by:

$$Ak = 1/(Ne - Ns + 1) \sum_{i=Ns}^{Ne} X_i. \quad (1)$$

From Equation (1), it is readily understood that the average level Ak is updated each time when the following level $X_{(Ne+1)}$ falls within the first predetermined range $\epsilon_1$. In addition, the end frame Ne is changed to Ne+1, as shown at the fifth step S5. This shows that the k-th stationary portion is comparatively stationary in level until a next following frame and may be extended to the next following frame. Thereafter, the fifth step S5 is returned back to the third step S3.

On the other hand, when the following level $X_{(Ne+1)}$ falls outside of the first predetermined range $\epsilon_1$, the fourth step S4 is succeeded by a sixth step S6 at which the start frame Ns is compared with the end frame Ne. Coincidence of the start frame Ns with the end frame Ne is indicative of the fact that a rapid change occurs in a single frame in question. In this event, similar operation is carried out about a following stationary portion (k+1) of the certain picture element x in the scene subsequence, as will later be described. To this end, initial values are set at a seventh step S7 for the next stationary portion. As a result, an adjacent frame succeeding the end frame of the k-th stationary portion is defined as a following start frame Ns and a following end frame Ne, as shown in FIG. 2, while a following level $X_{Ns}$ in the adjacent frame is determined as an average level Ak for the following stationary portion. After, the seventh step S7, the flowchart returns back to the third step S3.

Let incoincidence be detected between the start and the end frames Ns and Ne at the sixth step S6. In this case, the k-th stationary portion is continuously stationary over an interval between the start and the end frames Ns and Ne. Accordingly, an eighth step S8 follows the sixth step S6 to calculate a frame length or a time interval between the end frame and a specific frame Ns+1 following the start frame Ns. Thus, the frame length Nk is calculated in connection with the k-th stationary portion. Subsequently, processing proceeds to the following stationary portion k+1, as shown at the eighth step S8 in FIG. 2. The eighth step S8 is followed by the seventh step S7 for setting the initial values as already mentioned above.

When such processing comes to an end about all of the stationary portions in the scene subsequence of the certain picture element x, the third step S3 jumps to a ninth step S9 at which the average levels Ak are processed to determine the background data element A for the scene subsequence of the certain picture element x. In the example being illustrated, a weighted mean level $\overline{A}$, and a weighted square mean level $\overline{A^2}$ are calculated at the ninth step S9. Such a weighted mean level $\overline{A}$ and a weighted square mean level $\overline{A^2}$ are weighted in consideration of the frame lengths Nk of the stationary portions, as shown at the ninth step S9. Thereafter, a variance $\sigma^2$ for the scene subsequence of the certain picture element is calculated with reference to the weighted mean level $\overline{A}$ and the weighted square mean level $\overline{A^2}$ at the ninth step S9 which succeeds a tenth step S10. At the tenth step S10, the variance $\sigma^2$ is compared with a second predetermined range $\epsilon_2$ which is indicative of an acceptance range of the variance $\sigma^2$. If the variance $\sigma^2$ falls within the second predetermined range $\epsilon_2$, the tenth step S10 proceeds to an eleventh step S11 at which the weighted mean level $\overline{A}$ is determined as a desired average level Ad for the scene subsequence. Thereafter, processing is completed, as shown at a twelfth step S12.

If the variance $\sigma^2$ exceeds the second predetermined range $\epsilon_2$, the tenth step S10 is succeeded by a thirteenth step S13. The thirteenth step S13 is for calculating differences between the average levels Ak for the respective stationary portions and the weighted mean level $\overline{A}$ to detect a maximum one of the differences and to decide one of the average levels Ak that corresponds to the maximum difference and that is represented by Aj at the thirteenth step S13. Thereafter, the maximum average level Aj is removed from the first through k-th average levels. The remaining average levels except the maximum average level Aj are subjected to processing illustrated at the ninth through thirteenth steps S9 to S13. Thus, the background data element A is defined by the desired average level Ad for the certain picture element.

Similar operation is carried out to determine the background data elements about the remaining picture elements arranged in each frame and to produce a sequence of the background data elements as the background signal BG.

Accordingly, the background signal generator 23 illustrated in FIG. 1 carries out the above-mentioned operation at every one of the picture elements forming each frame to detect the stationary portions of each picture element and to calculate the desired average levels Ad of the picture elements. The desired average levels Ad are sent as the background signal BG from the background signal generator 23 to a coder 24 to be predictively coded into a coded background signal CBG. The coded background signal CBG is located at a leading portion for the recording signal sequence RI of the scene subsequence, as illustrated in the middle part of FIG. 1. In FIG. 1, the coded background signal CBG is followed by a sequence of error signals depicted at E(1), E(2), E(3) derived from each frame. The error signal E(1) may be subjected to intraframe predictive coding while the remaining error signals E(2), E(3) may be subjected to interframe predictive coding. In order to form the above-mentioned recording signal sequence, the background signal generator 23 allows the image signal sequence IM to pass therethrough as it stands after production of the background signal BG.

At any rate, the recording signal sequence RI is recorded in the form of a variable length code on the CD-ROM 20 and reproduced in the reproducing system 22 which is implemented by a decoder 25.

The illustrated decoder 25 comprises a prediction mode controller 26, a code inverter 27, a dequantizer 28, an adder 29, and a predictor 30. Supplied with the recording signal sequence RI carrying the coded background signal CBG and the error signals E, the prediction mode controller 26 detects a mode of each recording signal to produce a mode signal representative of any one of a background prediction mode, an intraframe prediction mode, and an interframe prediction mode. The code inverter 27 is operable to invert the variable length code into an invariable length code while the dequantizer 28 dequantizes the invariable length code into a dequantized signal which is supplied to the adder 29. The dequantized signal is added to a prediction signal sent from the predictor 30 to be produced as a decoded image signal DIM.

In the example, the decoder 25 at first decodes the coded background signal CBG located at the leading portion of the recording signal sequence. However, the predictor 30 does not produce a decoded background signal as the decoded image signal DIM but stores the decoded background signal into a background prediction circuit (not shown in this figure) of the predictor 30. Thus, the decoded background signal is used only for predicting a background. Thereafter, the recording signals RI are decoded into the decoded image signals DIM in a manner as mentioned in the copending U.S. patent application referenced in the preamble of the instant specification. As mentioned before, the background signal is produced in the background signal generator 23 by surveying a whole of each scene subsequence. Accordingly, it is possible to select an optimum background signal. In addition, the background signal is located at a leading portion of each scene subsequence. This results in a reduction of an amount of information to be stored in the CD-ROM 20. On the other hand, the decoder 25 can at first detect an optimum background signal on decoding each subsequence.

The background signal BG may be produced in relation to a sequence of blocks produced by dividing each frame into a plurality of blocks and by judging each block within each scene subsequence, although the illustrated background signal is produced in relation to each picture element.

Figure 3:
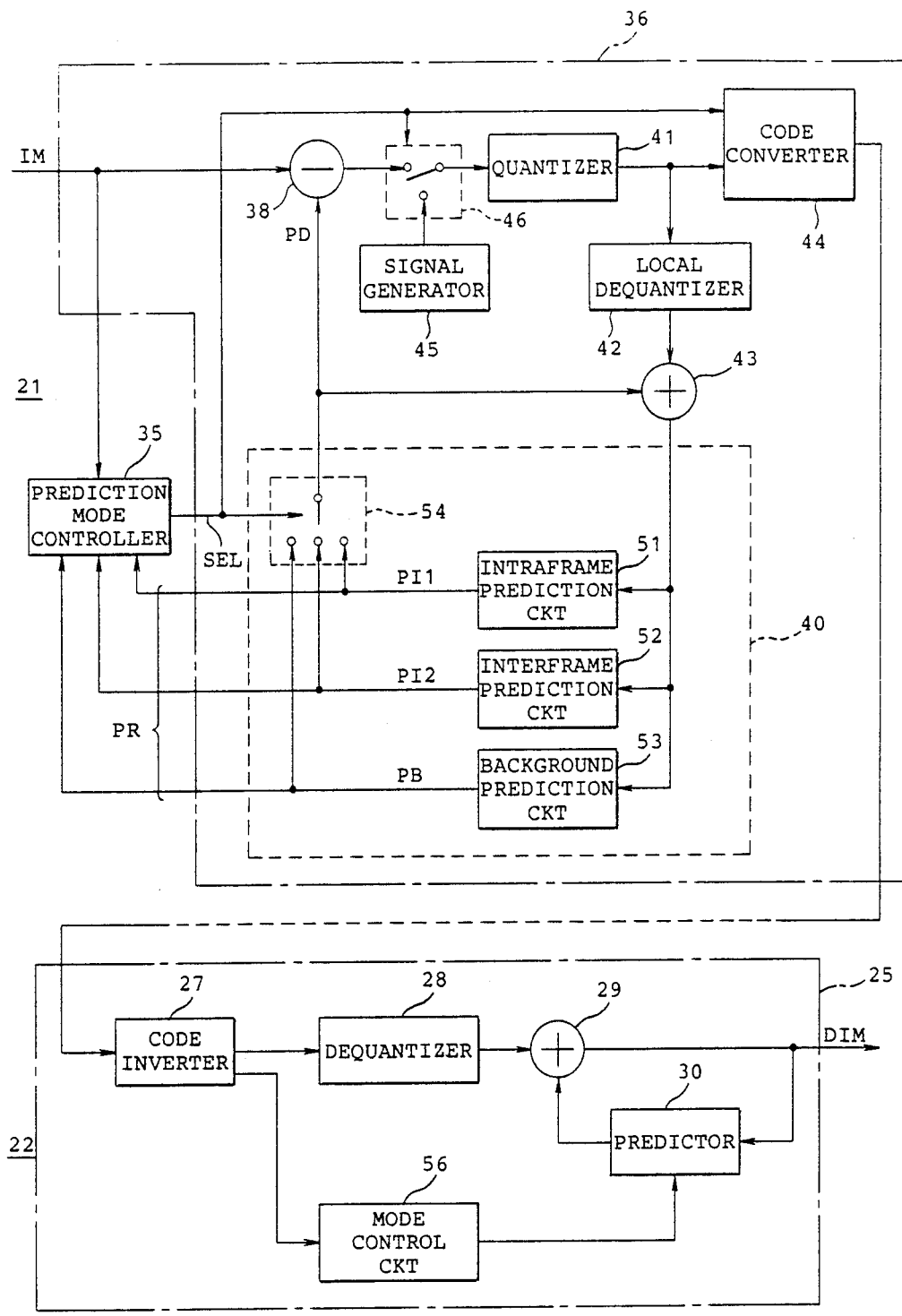
FIG. 3 is a block diagram of an image processing system according to a second embodiment of this invention.

Referring to FIG. 3, an image processing system according to a second embodiment of this invention comprises an image recording system 21 and an image reproducing system 22 as in FIG. 1. The illustrated image recording system 21 is operable in response to a sequence of image signals IM and specified by a prediction mode controller 35 and a coder 36 cooperating with the prediction mode controller 35. The image signal sequence IM may be considered as being divided into a sequence of partial image signals which are positioned within a sequence of frames, respectively. As regards FIG. 3, no consideration may be made about a scene subsequence described in connection with the illustrated recording system 21. For the time being, it may be understood that the illustrated coder 36 carries out a coding operation of the image signal sequence IM in a background prediction mode, an intraframe prediction mode, and an interframe prediction mode to produce a sequence of coded signals which is produced in the form of a variable length code and which may be recorded on a recording medium, such as a CD-ROM like in FIG. 1, although the recording medium is not shown in FIG. 3.

The prediction mode controller 35 is supplied with the image signal sequence IM and a prediction result signal which is given from the coder 36 in a manner to be described later and which is collectively depicted at PR. Specifically, the prediction result signal PR comprises a background prediction signal PB, an intraframe prediction signal PI1, and an interframe prediction signal PI2 which are representative of results of background prediction, intraframe prediction, and interframe prediction, respectively, as will later be described in detail.

Consequently, the prediction mode controller 35 produces a mode selection signal SEL which is representative of a selected one of the background prediction, the intraframe prediction, and the interframe prediction modes by comparing each of the image signals IM with the background, the intraframe, and the interframe prediction signals PB, PI1, and PI2. Thus, the mode selection signal SEL is produced by the prediction mode controller 35 to indicate a selected one of the background, the intraframe, and the interframe prediction modes. More specifically, the prediction mode controller 35 calculates absolute values of differences between the prediction result signal PR and each of the image signals IM. The differences may be calculated by subtracting each image signal from the background, the intraframe, and the interframe prediction signals PB, PI1, and PI2 and are produced as a background difference signal, an intraframe difference signal, and an interframe difference signal. The absolute values of the background, the intraframe, and the interframe difference signals are compared in the prediction mode controller 35 with one another to determine a minimum one of the absolute values. The prediction mode controller 35 delivers the mode selection signal SEL to the coder 36.

On selection of the background prediction mode, the prediction mode controller 35 compares the background difference signal with a predetermined threshold signal representative of a predetermined threshold level to judge whether or not the absolute value of the background difference signal is smaller than the predetermined threshold level. As a result, the mode selection signal SEL is indicative of the background prediction mode only when the absolute value is smaller than the predetermined threshold level. At any rate, the mode selection signal SEL serves not only to indicate the selected mode but also to specify a background portion of each frame. In other words, the prediction mode controller 35 acts to detect the background portion and may be referred to as a detecting circuit for detecting the background portion of each partial signal sequence. In this connection, the mode selection signal SEL may be called a background signal specific to the background portion.

The coder 36 can process a background portion of the image signal sequence IM in response to the mode selection signal SEL. The coder 36 comprises a subtracter 38, a predictor 40, a quantizer 41, a local dequantizer 42, an adder 43, and a code converter 44. Moreover, the illustrated coder 36 comprises a signal generator 45 for generating a preselected level signal indicative of a preselected level of, for example, zero and a first switch 46 operable in response to the mode selection signal SEL to selectively connect the substracter 38 and the signal generator 45. In addition, the predictor 40 is operable in response to an adder output signal sent from the adder 43 and comprises an intraframe prediction circuit 51, an interframe prediction circuit 52, a background prediction circuit 53, and a second switch 54. Responsive to the adder output signal, the intraframe, the interframe, and the background prediction circuits 51, 52, and 53 selectively carry out intraframe, interframe, and background predictions in usual manners to supply the intraframe, the interframe, and the background prediction signals PI1, PI2, and PB, respectively, to both the second switch 54 and the prediction mode controller 35.

The prediction mode controller 35 carries out operation in the manner mentioned before to supply the mode selection signal SEL to the first and the second switches 46 and 54. When the background prediction mode is not indicated by the mode selection signal SEL, the first switch 46 connects the subtracter 38 to the quantizer 41 while the second switch 54 connects either one of the intraframe and the interframe prediction circuits 51 and 52. Under the circumstances, a selected one of the intraframe and the interframe prediction signals PI1 and PI2 is delivered to the subtracter 38 through the second switch 54 as the local prediction signal PD. In this event, the predictor 40 is operable in a selected one of the intraframe and the interframe prediction modes. As a result, the subtracter 38 subtracts the local prediction signal PD from each of the image signals IM to produce an error signal indicative of a difference between the local prediction signal PD and each of the image signals IM. The error signal is quantized into a quantized signal by the quantizer 41 to be delivered to the code converter 44 and the local dequantizer 42 in a usual manner. The quantizer 41, the dequantizer 42, the adder 43, and the code converter 44 are known in the art and will not be described further.

On the other hand, when the background prediction mode is indicated by the mode selection signal SEL as a result of calculation carried out in the prediction mode controller 35, the first switch 46 forcibly connects the signal generator 45 to the quantizer 41 while the second switch 54 selects the background prediction circuit 53. Consequently, the error signal is forcibly rendered the predetermined value, namely, zero. The preselected value signal is dequantized by the local dequantizer 42 to be added to the local prediction signal PD. The local prediction signal PD is added to the predetermined value and sent to the intraframe, the interframe, and the background prediction circuits 51, 52, and 53.

In the example being illustrated, the mode selection signal SEL is also delivered to the code converter 44 and is coded into an additional variable length code which is produced as the coded signal sequence together with the variable code resulting from coding of the image signals.

The decoder 25 of FIG. 3 is supplied with the coded signal sequence and is similar to that illustrated in FIG.

1 except that a mode control circuit 56 is coupled to the code converter 27. In the example, the mode control circuit 56 detects the mode selection signal SEL from an output signal of the code converter 27 to control the predictor 30.

Figure 4:
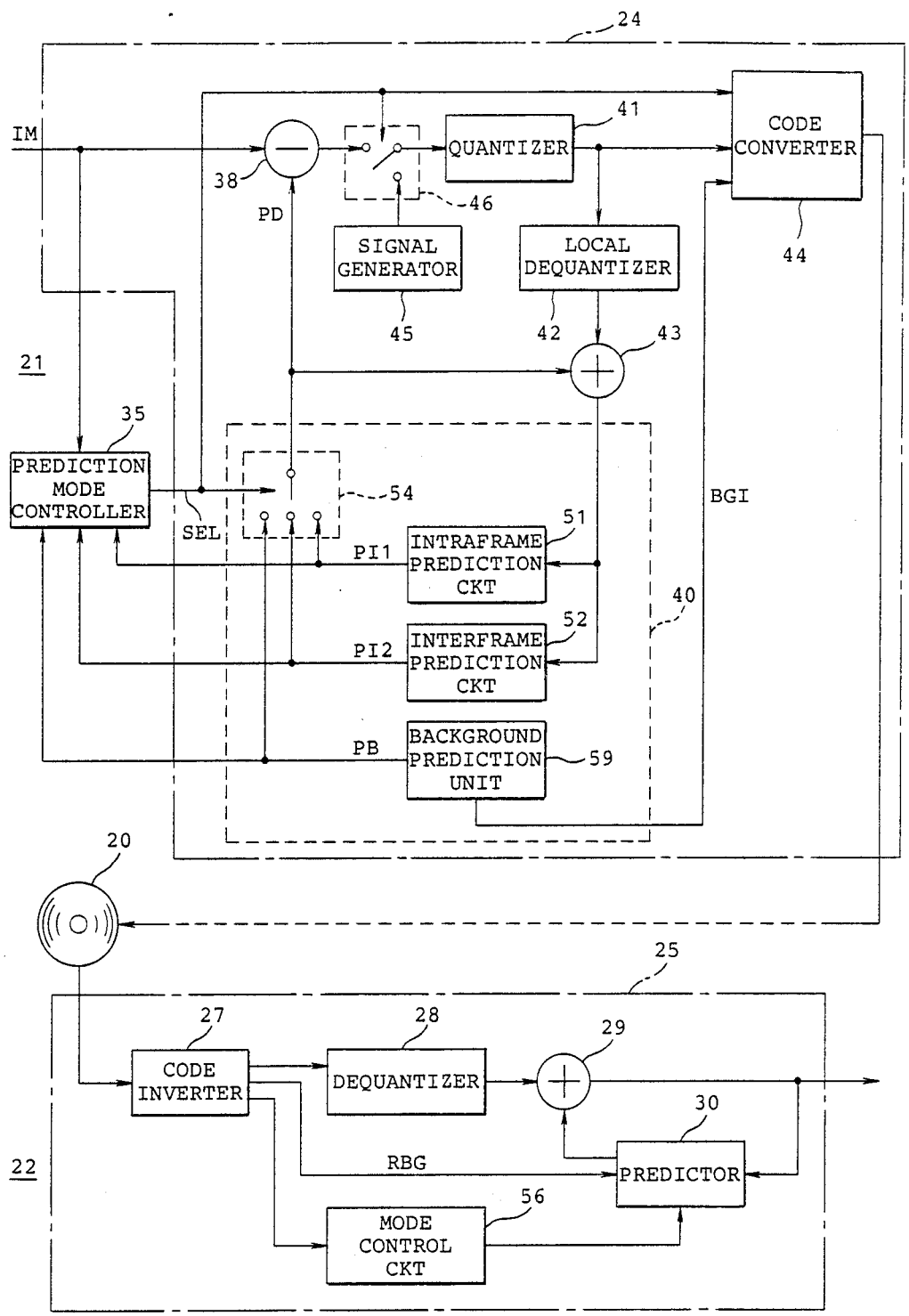
FIG. 4 is a block diagram of an image processing system according to a third embodiment of this invention.

Referring to FIG. 4, an image processing system according to a third embodiment of this invention is similar to that illustrated in FIG. 3 except that a background prediction unit 59 is connected to the code converter 44. The background prediction unit 59 stores a background image signal which is calculated in a manner as mentioned with reference to FIG. 2 prior to predictive coding of the image signal sequence IM. In this connection, the background prediction unit 59 may be connected directly to the background signal generator 23 illustrated in FIG. 1 and the background image signal BGI may be identical with the background signal BG illustrated in FIG. 2. The background prediction unit 59 delivers the background image signal BGI to the code converter 44 and the background prediction signal PB to the prediction mode controller 35. The background image signal BGI is coded by the code converter 44 prior to a sequence of error signals resulting from predictive coding. Anyway, a combination of the background image signal BGI and the error signal sequence is recorded on the recording medium 20, such as a CD-ROM, in the form of a sequence of coded or processed signals.

The coded signal sequence is read out of the recording medium 20 to be sent to a decoder 25 which is similar to that illustrated in FIG. 4 except that a background image signal RBG read out of the recording medium 20 is delivered from the code inverter 27 to the predictor 30. The background image signal RBG is decoded into a decoded background signal prior to an error signal sequence read out of the recording medium 20 and is used for background prediction, as described in conjunction with FIG. 2.

Selection of the prediction modes may be carried out either at every picture element or at every block composed of a plurality of picture elements. In the latter case, background prediction may be selected when a difference for each picture element is calculated by comparing the image signals of each block with a background image, and is smaller than a threshold level. If the background prediction is selected as regards a certain block, the preselected level, namely, zero is produced about all of the picture elements in the block in question.

It is possible to locally and optionally extract a part of the image wherein small error signals concentratedly appear for the picture elements of the part.

In FIGS. 3 and 4, an invariable level or zero level signal is produced by the signal generator 45 in the background prediction mode and is coded into the code converter 44. Therefore, it is possible to reduce an amount of information necessary for transmitting or recording a background.

Figure 5:
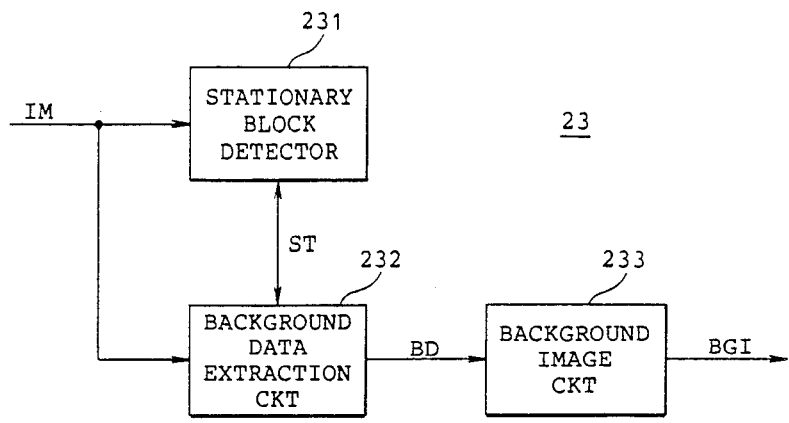
FIG. 5 is a block diagram of an image processing system according to a fourth embodiment of this invention.
Figure 6:
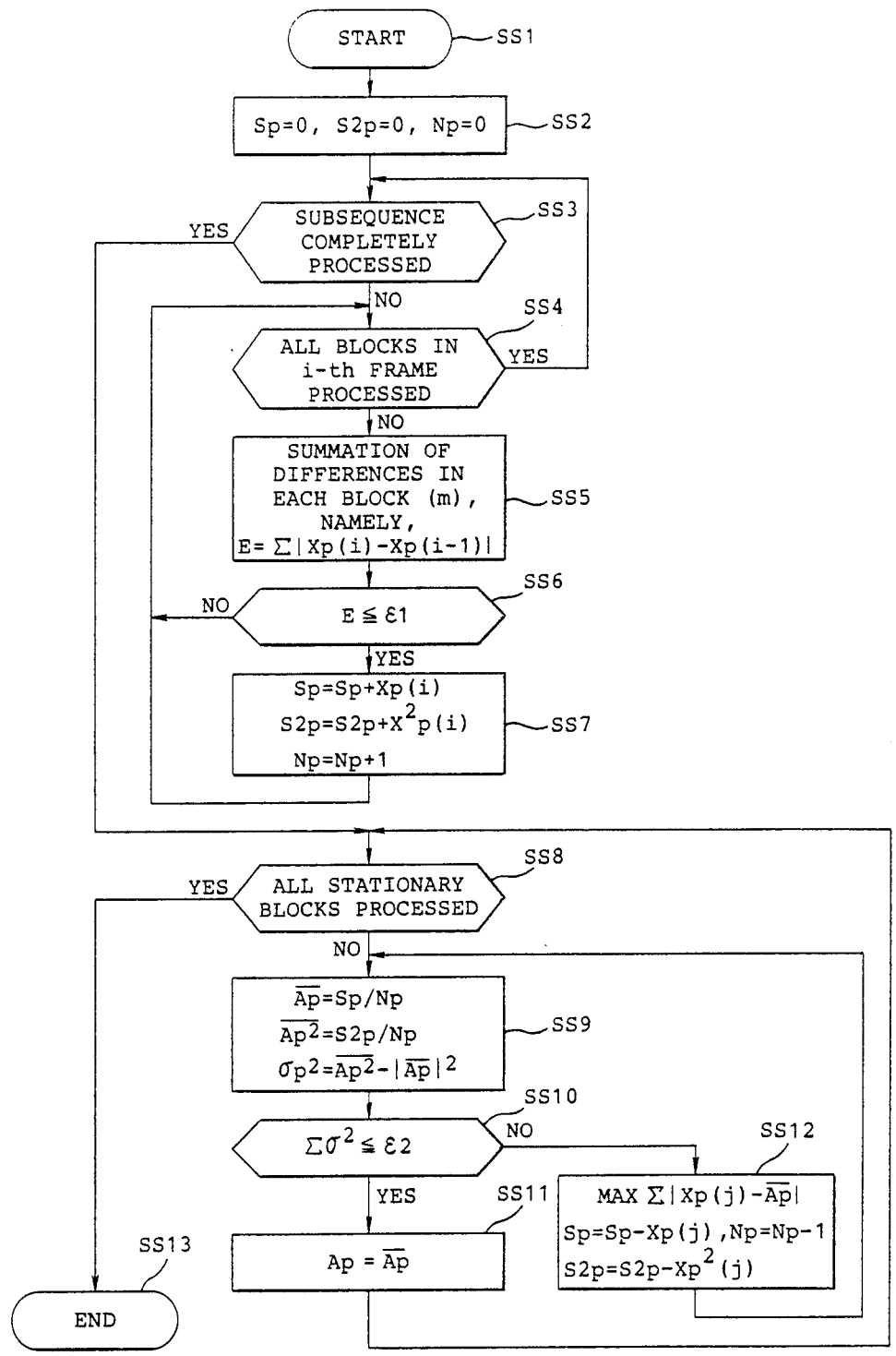
FIG. 6 is a flow chart for use in describing operation of the image processing system illustrated in FIG. 5.

Referring to FIGS. 5 and 6, an image processing system according to a fourth embodiment of this invention is specified by a background signal generator 23 which is located in an image recording system 21 prior to a coder 24, as in FIG. 1, and which serves to produce a background signal BG in response to a sequence of image signals IM. In the example being illustrated, the image signal sequence IM is processed in the background signal generator 23 at every block of the image signal sequence that is formed by dividing each frame of the image signal sequence IM. Therefore, it may be said that the image signal sequence IM is given from an external device (not shown), such as a video tape recorder, to the background signal generator 23 at every block composed of a plurality of picture elements each of which is variable with time, as mentioned in conjunction with FIG. 2. Each of the picture elements carries a scene subsequence which is sectioned by a pair of scene changes and which may be subdivided into a plurality of comparatively stationary portions, as mentioned before. Each stationary portion is assumed to last for a plurality of frames, as in FIG. 2.

In FIG. 5, the illustrated background signal generator 23 comprises a stationary block detector 231, a background data extraction circuit 232, and a background image circuit 233, all of which are operable in a manner to be described with reference to FIG. 6. The background signal generator 23 may be practically implemented by a microprocessor which can carry out operation as illustrated in FIG. 6. Therefore, each of the circuits 231, 232, and 233 in FIG. 5 can be made to correspond to the step or steps of FIG. 6.

Let a selected block m of an i-th frame of the image signal sequence IM be supplied to the stationary block detector 231 and the background data extraction circuit 232. The selected block m is stored in the background data extraction circuit 232 until processing is completed about the selected block m in the stationary block detector 231. In addition, each of the picture elements (designated $x_p$) is processed during a subsequence which is defined by the scene changes and which might have at least one stationary portion.

Under the circumstances, the stationary block detector 231 successively processes picture elements $x_p$ of the selected block. Each of the picture elements $x_p$ is assumed to have a level $x_p(i)$ in the i-th frame. As shown in FIG. 6, operation of the stationary block detector 231 is started at a first step SS1 followed by a second step SS2 at which the stationary block detector 231 is put into an initial state by setting initial values. As the initial values, a sum Sp and a square sum S2p of levels and a frame number Np are selected for each of the picture elements and are set to zero at the second step SS2. The sum Sp and the square sum S2p are calculated by adding the levels of each picture element $x_p$ in the selected block, as will become clear as the description proceeds.

The stationary block detector 231 judges at a third step SS3 whether or not the subsequence in question is completely processed. If processing is not completed about the subsequence, the third step SS3 is followed by a fourth step SS4 for judging whether or not all of blocks in the i-th frame are processed. When the processing is furnished about all the blocks in the i-th frame, the flow chart proceeds from the fourth step SS4 back to the third step SS3.

If the processing is being continued as regards the i-th frame, the fourth step SS4 proceeds to a fifth step SS5 at which a difference between the i-th frame and a preceding, namely, (i-1)-th frame, is calculated for each picture element $x_p$ in the selected block. Practically, absolute values of the differences are summed up as regards all of the picture elements in the selected block so as to calculate a difference value E between two adjacent ones of the frames. Thus, the first through fifth steps SS1 to SS5 serve to calculate the difference value E and may be called a difference calculation unit.

Thereafter, the difference value E is compared with a first prescribed threshold value $\epsilon_1$ at a sixth step SS6 in the background block detector 231. If the difference value E falls within a range defined by the first prescribed threshold value $\epsilon_1$, the selected block may be judged to be a stationary block. Otherwise, the flow chart proceeds from the sixth step SS6 back to the fourth step SS4.

When the selected block m is judged as a stationary block, the stationary block detector 231 illustrated in FIG. 5 supplies the background data extraction circuit 232 at the sixth step SS6 with a stationary block indication signal ST representative of occurrence of a stationary block. This shows that all of the picture elements of the selected block m are judged as a background by the stationary block detector 231.

Supplied with the stationary block indication signal ST, the background data extraction circuit 232 carries out a seventh step SS7 at which each level Xp(i) of the picture elements in the selected block m is extracted as a background data signal BD from the image signal IM. The background data signal BD is representative of a sequence of stationary block images and may be referred to as a sequence of stationary block image signals. In this event, an extracted level Xp(i) of each picture element $x_p$ in the stationary block is summed up for the scene subsequence to calculate the sum Sp of the levels, as shown in the seventh step SS7. The square sum S2p of the extracted levels is also calculated for each picture element $x_p$ and the frame number Np is counted up by one. Thereafter, the seventh step SS7 is turned to the fourth step SS4. Thus, the scene subsequence of the selected block m is completely processed by the stationary block detector 231 and the background data extraction circuit 232; and the flow chart jumps from the third step SS3 to an eighth step SS8 which is carried out by the background image circuit 233. Similar operation is repeated until processing is completed about all of the blocks in the i-th frame.

At the eighth step SS8, the background image circuit 233 detects whether or not the background data signal BD is entirely processed by the background image circuit 233. If the processing is not completed by the background image circuit 233, a ninth step SS9 follows the eighth step SS8 to process each block at every picture element.

More specifically, an average level $\overline{Ap}$, a square mean value $\overline{Ap^2}$, and a variance $\sigma_p^2$ of the levels in the stationary block are calculated with reference to the sum Sp, the square sum S2p, and the frame number Np at every picture element $x_p$ of the stationary block. The calculated variance $\sigma_p^2$ is summed up in relation to all of the picture elements $x_p$ of each block to obtain a total of the variances $\sigma_p^2$. The total of the variances $\sigma_p^2$ is compared at a tenth step SS10 with a second prescribed threshold level or value $\epsilon_2$ determined in relation to an acceptance range. If the total of variances $\sigma_p^2$ falls within the acceptance range determined by the second prescribed threshold level $\epsilon_2$, the average level $\overline{Ap}$ of each picture element in the stationary block is regarded as a background image element Ap, as shown at an eleventh step SS11. In other words, the average levels $\overline{Ap}$ of the picture elements in the stationary block are all used as a background image signal BGI composed of the background image elements Ap.

On the other hand, when the total of the variances $\sigma_p^2$ exceeds the second prescribed threshold level $\epsilon_2$, the tenth step SS10 is followed by a twelfth step SS12 for processing a nonstationary block. Specifically, absolute values of differences between the levels Xp(j) of the picture elements are summed up in each frame to select a maximum one of the absolute values. In FIG. 6, the maximum absolute value is assumed to be calculated in connection with picture elements $x_p(j)$ of a j-th frame derived from a block which is judged as a nonstationary block. In this event, the picture elements $x_p(j)$ and the j-th frame are removed from the sum level Sp, the square sum S2p, and the frame number Np at the twelfth step SS12. Thereafter, similar operation is carried out from the eighth step SS8 about the remaining picture elements $x_p$.

When all of the stationary blocks are processed at the eighth step SS8, the processing comes to an end at a thirteenth step SS13.

Thus, the background image signal BGI is produced from the background image circuit 233 at every block by using correlations between frames and within each frame and by selecting optimum picture elements in accordance with a predetermined condition in consideration of a whole of each scene subsequence. At any rate, the background image signal BGI may be supplied to a coder in a manner illustrated in FIG. 1 as a background signal.

The difference value E calculated at the fifth step SS5 may be replaced by a square value of differences calculated between frames at picture element in each block. At the twelfth step SS12, it is possible to remove from a background a block such that an average value given by dividing absolute values of differences between levels of picture elements in each block and an average level $\overline{Ap}$ by the number of the picture elements in each block exceeds that average value $\sigma$ of deviations $\sigma_p$ in each background data signal which is calculated for each picture element in each block.

As regards a nondetection block of a background wherein a stationary block is not judged at all during the third through seventh steps SS3 to SS7, the first prescribed threshold level $\epsilon_1$ may be increased by a predetermined value and thereafter the steps SS2 to SS7 may be repeated again. Alternatively, the nondetection block may be subdivided into a plurality of partial blocks each of which is subjected to similar processing. Such subdivision of the block can be made until a block size finally becomes equal to a single picture element. When no background value is determined in relation to a picture element, it is possible to predictively interpolate a background value about the above-mentioned picture element with reference to background values of adjacent picture elements.

Thus, the background signal generator 23 illustrated in FIGS. 5 and 6 processes the image signal sequence at every block to detect a background. In other words, the background is determined by the use of correlations within each frame and among frames, namely, both of intraframe and interframe correlations. Accordingly, it is possible to reduce a variation of prediction levels among picture elements in each frame and a variation of errors of each picture element among frames and, therefore, to obtain a background image which is free from the above-mentioned variations. In addition, a background level can be detected even by the use of a picture element wherein a background level can not be detected in a known manner. This enables effective suppression of that selection error of a background data signal which might appear along a boundary of background objects or patterns.

Figure 7:
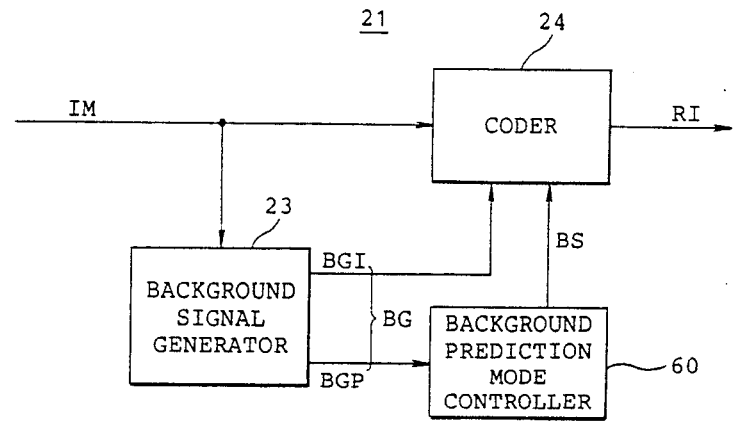
FIG. 7 is a block diagram of an image processing system according to a fifth embodiment of this invention.
Figure 8:
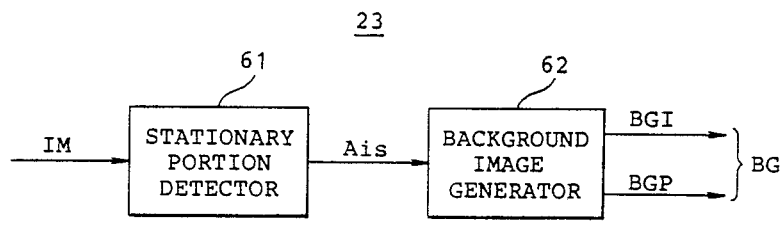
FIG. 8 is a block diagram of a portion of the image processing system illustrated in FIG. 7.
Figure 9:
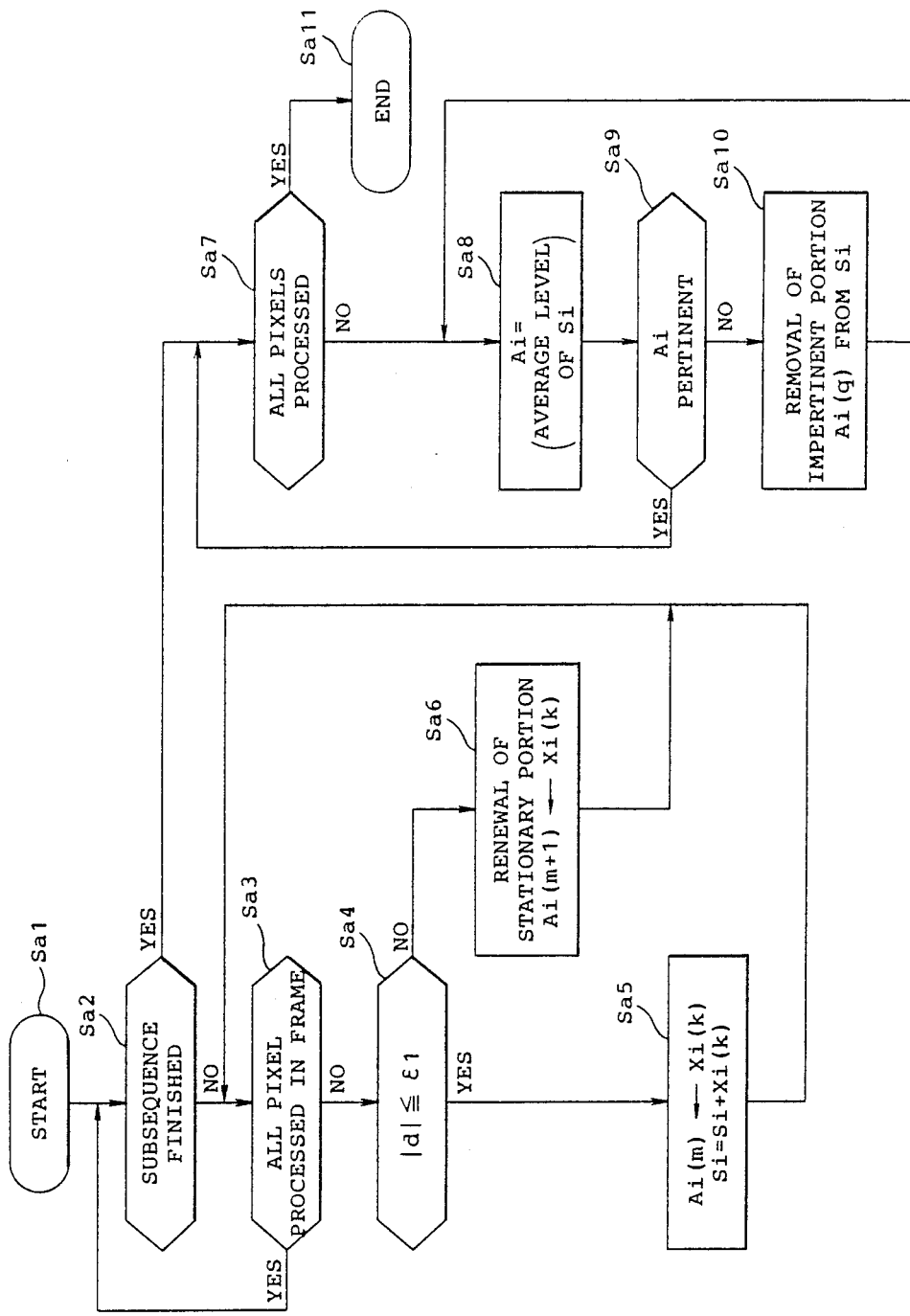
FIG. 9 is a flow chart for use in describing operation of the image processing system illustrated in FIG. 7.

Referring to FIGS. 7 through 10, an image processing system according to a fifth embodiment of this invention comprises an image recording system 21 implemented by a background signal generator 23, a coder 24, and a background prediction mode controller 60, as shown in FIG. 7. The illustrated background signal generator 23 is operable in response to the image signal sequence IM to produce, as a background signal BG, a sequence of background image signals BGI and a sequence of background extraction signals BGP. The background extraction signals BGP are representative of relationships between picture elements of the image signals and the background image signals BGI, as will become clear. To this end, the background signal generator 23 comprises a stationary portion detector 61 and a background image generator 62, as shown in FIG. 8, and is operable in accordance with procedures which will be described in conjunction with FIG. 9 and which are similar to those illustrated in FIG. 2. Taking this into consideration, the procedures of FIG. 9 are simplified in comparison with those of FIG. 2, as will become clear later.

In FIGS. 8 and 9, the stationary portion detector 61 starts operation at a first step Sa1 and executes second and third steps Sa2 and Sa3. The second step Sa2 is for judging whether or not processing is carried out about a scene subsequence of a single picture element which may be abbreviated to pixel, like the third step S3 of FIG. 2 while the third step Sa3 is for judging whether or not all of picture elements (pixels) in a frame are processed in the background signal generator 23.

At any rate, the stationary portion detection 61 is led to a fourth step Sa4 at the beginning of operation through the first through third steps Sa1 to Sa3. The fourth step Sa4 is similar to the fourth step S4 of FIG. 2 and is for judging whether or not a level $X_i$ of an i-th picture element i is stationary in the image signal sequence IM. Specifically, let the i-th picture frame be stationary between a j-th frame and a (k-1)-th frame and consequently form a stationary portion or duration $A_i(m)$ therebetween. In this case, a difference d is calculated between a level $X_i(k)$ of the picture element i in the k-th frame and an average signal level of the stationary portion $A_i(m)$ and is compared with a first threshold level $\epsilon_1$, where m is indicative of the number of stationary portions of the i-th picture element. If the difference d is not greater than the first threshold level $\epsilon_1$, the level $X_i(k)$ is regarded as a data level of the stationary portion $A_i(m)$ and is added to a sum $S_i$ calculated for the i-th picture element, at a fifth step Sa5. Otherwise, the level $X_i(k)$ is regarded as an initial level of the next following stationary portion $A_i(m+1)$ at a sixth step Sa6.

Thereafter, the fourth through sixth steps Sa4 to Sa6 are carried out about all of the picture elements in each frame to calculate all of the stationary portions $A_i(1)$ to $A_i(n)$ of each picture element together with each sum $S_i$ calculated for each picture element.

When the above-mentioned calculation is completed about the scene subsequence, the second step Sa2 is followed through a seventh step Sa7 by an eighth step Sa8.

In FIG. 8, the stationary portions $A_i(1)$ to $A_i(n)$ are sent from the stationary portion detector 61 to the background image generator 62 as a sequence of stationary portion signals depicted at Ais. The background image generator 62 calculates an average level of the sum $S_i$ at the eighth step Sa8 to predictively produce the average level of $S_i$ as a predictive background level $A_i$ of the i-th picture element. Subsequently, the background image generator 62 judges at a ninth step Sa9 whether or not the predictive background level $A_i$ is pertinent. The ninth step Sa9 may be carried out by the use of a variance, as shown in the ninth and the tenth steps S9 and S10 of FIG. 2.

If the predictive background level $A_i$ is impertinent, an impertinent stationary portion $A_i(q)$ is removed from the sum $S_i$ at a tenth step Sa10 similar to the thirteenth step S13 of FIG. 2 to repeat the operation from the eighth step Sa8 about the remaining stationary portions again. Otherwise, the flow chart proceeds from the tenth step Sa10 back to the seventh step Sa7 for judging whether or not all of the picture elements are processed. When the background image generator 62 judges at the seventh step Sa7 that all picture elements are processed, the processing comes to an end at an eleventh step Sa11.

The background image generator 62 can successively produce the background image signal BGI by carrying out the seventh through tenth steps Sa7 to Sa10. Accordingly, it is readily understood that each background image signal BGI is specified by the average level of each sum $S_i$. In addition, the background image generator 62 can also produce the background extraction signal BGP by monitoring the remaining stationary portions which are not removed at the tenth step Sa10. Specifically, the background extraction signals are representative of the fact that the remaining stationary portions except the removed stationary portion are formed by which one or ones of the picture elements in which one of the frames.

The background image signals BGI and the background extraction signals BGP are delivered as the background signal BG to the coder 24 and to the background prediction mode controller 60, both of which are illustrated in FIG. 7. Responsive to the background extraction signals BGP, the background prediction mode controller 60 produces a background prediction selection signal BS in synchronism with the background image signals BGI supplied to the coder 24. The background prediction mode selection signals BS may not always be in one-to-one correspondence to the background extraction signals BGP. In other words, the background prediction mode signals BS may be not produced even on reception of the background extraction signals BGP when background extracted picture elements are isolated from other background extracted picture elements or background unextracted picture elements are surrounded by background extracted picture elements.

Figure 10:
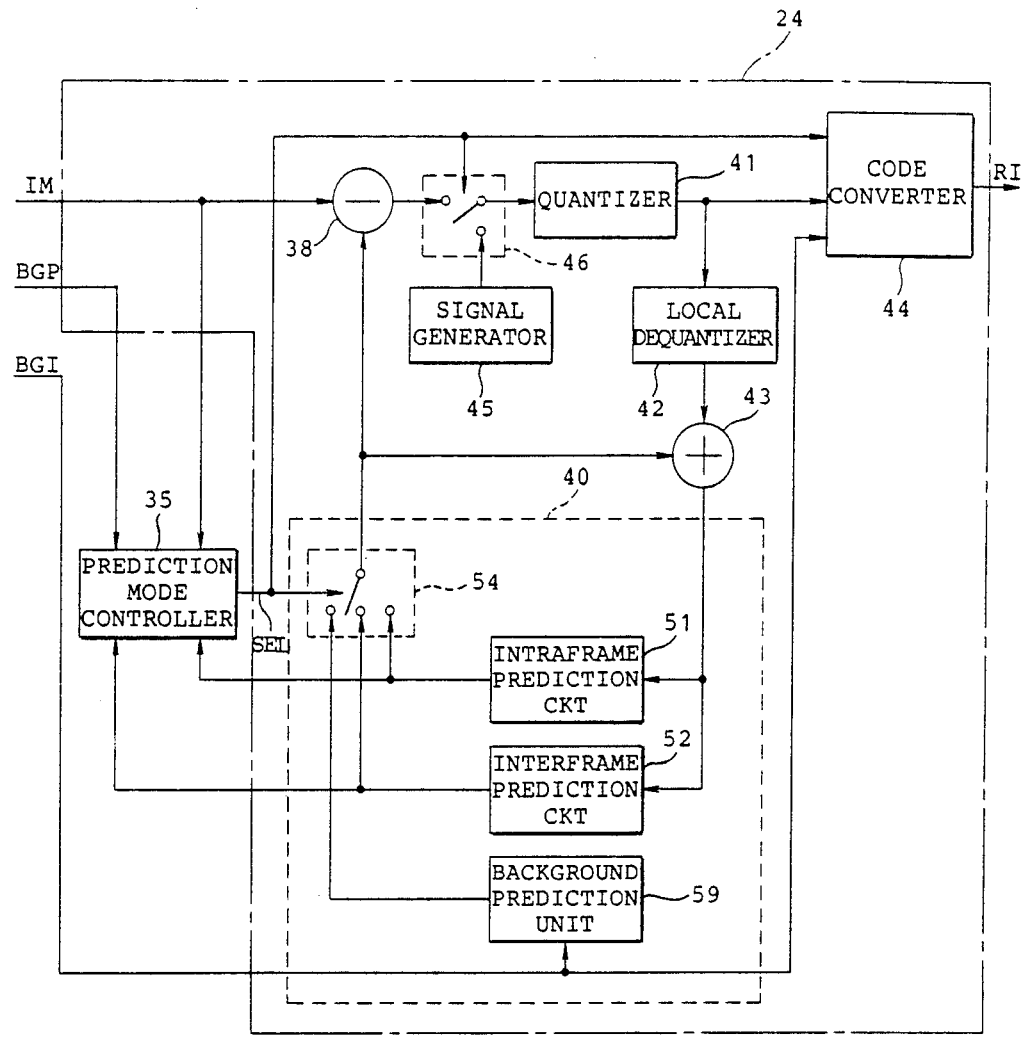
FIG. 10 is a block diagram of another part of the image processing system illustrated in FIG. 7.

Referring to FIG. 10 in addition to FIG. 7, the coder 24 is similar to that illustrated in FIG. 4 except that the prediction mode controller is supplied with the background extraction signal BGP instead of the background prediction signal PB (FIG. 3) and the background prediction unit 59 is supplied with the background image signals BGI to be stored therein.

In FIG. 10, both the image signal sequence IM and the background extraction signals BGP are supplied to the prediction mode controller 35 while the background image signals BGI are supplied to the coder 24. The prediction mode controller 35 judges either one of the intraframe, the interframe, and the background prediction modes in response to the image signal sequence IM and the background extraction signals BGP to produce the mode selection signal SEL indicative of a selected one of the modes. The mode selection signal SEL is sent to the code converter 44, the first switch 46, and the second switch 54.

On the other hand, the background image signals BGI are delivered to the background prediction unit 59 and the code converter 44.

When the mode selection signal SEL indicates the background prediction mode as the selected mode, the first switch 46 connects the signal generator 45 to the quantizer 41 while the second switch 54 selects the background prediction unit 59. Under the circumstances, the background image signals PGI are sent to the code converter 44. The background image signals PGI are coded into coded background image signals together with the mode selection signal SEL by the code converter 44. In this case, the coded background image signals may be placed at a leading portion of the coded signal sequence, as illustrated in FIG. 1. During prediction of the background, a sequence of zero level signals is sent from the signal generator 45, the first switch 46, the quantizer 41, and the local dequantizer 42 to the adder 43 which is supplied with the background image signal BGI through the second switch 54.

The background extraction signals BGP may be extracted at every block composed of a plurality of picture elements. In this case, the zero level signals are produced from the signal generator 45 for all of picture elements placed in a block judged as a background.

While this invention has thus far been described in conjunction with several embodiments thereof, it will readily be possible for those skilled in the art to put this invention into practice in various other manners. For example, the coded background signal may be placed not only at the leading position of the scene subsequence but also at a different position. In addition, the background image signals BGI may be subjected to predictive coding. Any other recording medium, such as a video tape, may be substituted for the CD-ROM. A spatial filter may be located between the predictor 40 and the subtracter 38. Each error signal may be subjected to orthogonal transform, motion compensation, and/or vector quantization. In order to carry out the orthogonal transform, the quantizer 41 and the local dequantizer 42 may include an orthogonal transform circuit and an orthogonal inverse transform circuit, respectively. On the other hand, the vector quantization can be carried out by including a vector quantization circuit and a vector dequantization circuit in the quantizer and the local dequantizer, respectively. It is preferred, therefore, that the present invention be limited not by the specific disclosure herein, but only by the appended claims.

What is claimed is:

1. An image processing system for use in processing a sequence of image signals into a sequence of processed signals, said image signals being divisible into start through end frames and carrying a moving image which is variable with time and which is sectioned into a rapidly moving portion and a background portion slowly varying in comparison with said rapidly moving portion, said image signal sequence being divisible into a sequence of partial image signals each of which lasts for an interval of time not shorter than a single frame, said image signal sequence being arranged from said start frame to said end frame, said rapidly moving portion being predictively coded, said image processing system comprising:

detecting means responsive to each of said partial image signals for entirely detecting the background portions in said partial image signals from said start frame to said end frame to produce a background signal specific to each of said background portions from said start frame to said end frame prior to coding of said rapidly moving portion;

coding means coupled to said detecting means and supplied with said image signal sequence after production of said background signal for predictively coding said image signal sequence into a sequence of coded signals with reference to presence and absence of said background signal, respectively; and means for producing said coded signal sequence as said processed signal sequence.

2. An image processing system as claimed in claim 1, each of said image signals having a level variable with time, wherein said detecting means comprises:

monitoring means supplied with said partial image signals from said start frame to said end frame for monitoring a level variation of each of said partial image signals to judge whether or not the variation of said each partial image signal falls within a predetermined range and to decide the background portion of said each partial image signal;

calculating means coupled to said monitoring means for calculating an average level of the background portion over said start through said end frames; and means coupled to said calculating means for producing said average level as said background signal.

3. An image processing system as claimed in claim 1, said moving image appearing as a sequence of scenes which is divisible into a plurality of scene subsequences each of which is defined by two adjacent ones of scene changes at which the moving image is drastically changed, wherein each of said partial image signals specifies each of said scene subsequences.

4. An image processing system as claimed in claim 2, said image signal sequence being divisible into a sequence of frames, wherein each of said partial image signals is produced within each of said frames.

5. An image processing system as claimed in claim 1, wherein said coding means comprises:

means for producing an invariable level signal representative of an invariable level;

means responsive to said image signal sequence and said background signal for carrying out predictive coding of said image signal sequence by making use of said invariable level signal in the presence of said background signal and, otherwise, by making no use of said invariable level signal to produce said coded signal sequences, respectively.

6. An image processing system as claimed in claim 1, said image signal sequence being divisible into said start through said end frames each of which is subdivided into a plurality of blocks, wherein said detecting means comprises:

difference calculation means responsive to said image signal sequence for calculating a sequence of differences between adjacent ones of said frames at every one of the blocks to produce a sequence of block difference signals representative of said differences, respectively;

means coupled to said difference calculating means for judging whether or not each of said block difference signals specifies a stationary block to produce a stationary block signal on detecting said stationary block;

deriving means responsive to said image signal sequence and coupled to said judging means for extracting the image signals as a sequence of stationary block image signals from the stationary block in response to said stationary block signal;

processing means coupled to said deriving means for processing said stationary block image signals into a background image signal; and means for producing said background image signal as said background signal.

7. An image processing system as claimed in claim 1, said image signal sequence carrying a sequence of picture elements and being divisible into said start through said end frames, wherein said detecting means comprises:

processing means responsive to said image signal sequence for processing the image signals of each frame at every picture element to produce a sequence of background image signals extracted from the picture elements in said background portion and a sequence of background position signals specifying the picture elements in said background portion; and means coupled to said processing means for supplying said background image signal sequence and said background position signal sequence as said background signal to said coding means.

8. An image processing system for use in processing a sequence of image signals into a sequence of processed signals, said image signals being divisible into start through end frames and carrying a moving image which is variable with time and which is sectioned into a rapidly moving portion and a background portion slowly varying in comparison with said rapidly moving portion, said image processing system comprising:

detecting means supplied with said image signal sequence from said start frame to said end frame and a sequence of prediction result signals for entirely detecting said background portion from said start frame to said end frame of said image signal sequence in response to said prediction result signals to produce a background indication signal representative of detection of said background portion;

coding means selectively operable in a background prediction mode and an additional prediction mode different from said background prediction mode and responsive to said image signal sequence and coupled to said detecting means for coding said image signal sequence into said processed signal sequence in a selected one of said background and said additional prediction modes in response to said background indication signal;

said coding means comprises:

signal producing means coupled to said detecting means for producing a sequence of preselected invariable level signals only in response to said background indication signal as said processed signals;

prediction means responsive to said image signal sequence and coupled to said detecting means for coding said image signal sequence into a sequence of prediction signals in a selected one of said background and said additional prediction modes in response to said background indication signal;

means coupled to said signal producing means and said prediction means for selectively producing said preselected invariable level signal sequence and said prediction signal sequence as said processed signals; and means coupled to said prediction means for supplying said prediction signals as said prediction result signals to said detecting means.

9. An image recording system for use in recording a sequence of recording signals on a recording medium in response to a sequence of image signals which carry a moving image variable with time and which is divisible into start through end frames, said moving image being sectioned into a rapidly moving portion and a background portion which slowly varies in comparison with said rapidly moving portion, said image signal sequence being divisible into a sequence of partial image signals each of which lasts for an interval of time not shorter than a single frame, said image signal sequence being divisible into a sequence of partial image signals, said recording system comprising:

detecting means responsive to each of said partial image signals for entirely detecting the background portion in said partial image signals from said start frame to said end frame to produce a background signal specific to each of said background portions from said start frame to said end frame prior to coding of said rapidly moving portion;

coding means coupled to said detecting means and supplied with said image signal sequence after production of said background signal for predictively coding said image signal sequence into a sequence of coded signals with reference to presence and absence of said background signal, respectively; and means for producing said coded signal sequence as said recording signal sequence.

* * * * *